United States Patent [19]

Dowbenko et al.

[11] Patent Number: 4,499,150

[45] Date of Patent: Feb. 12, 1985

[54] COLOR PLUS CLEAR COATING METHOD UTILIZING ADDITION INTERPOLYMERS CONTAINING ALKOXY SILANE AND/OR ACYLOXY SILANE GROUPS

[75] Inventors: Rostyslaw Dowbenko; Raymond S. Stewart, both of Gibsonia; Marvis E. Hartman, Pittsburgh; Barbara Gorman, Allison Park; Stephen J. Thomas, Aspinwall, all of Pa.

[73] Assignee: PPG Industries, Inc., Pittsburgh, Pa.

[21] Appl. No.: 480,152

[22] Filed: Mar. 29, 1983

[51] Int. Cl.[3] .......................... B05D 1/36; B05D 3/02; B05D 7/00; B32B 9/04

[52] U.S. Cl. .................................... 428/447; 427/380; 427/407.1; 427/409; 428/450

[58] Field of Search ...................... 427/407.1, 408, 409, 427/410, 412, 412.1, 379, 380; 428/447, 450

[56] References Cited

U.S. PATENT DOCUMENTS

| | | | |
|---|---|---|---|
| 3,423,376 | 1/1969 | Gobran et al. | 260/80.3 |
| 3,467,634 | 9/1969 | Jacknow et al. | 260/80.71 |
| 4,043,953 | 8/1977 | Chang et al. | 260/18 S |
| 4,147,685 | 4/1979 | Smith, Jr. | 427/410 X |
| 4,157,321 | 6/1979 | Kawakami et al. | 260/29.1 SB |
| 4,336,309 | 6/1982 | Jäckel et al. | 428/447 |
| 4,384,013 | 5/1983 | Noren | 427/387 X |
| 4,396,650 | 8/1983 | Lange et al. | 427/409 |

FOREIGN PATENT DOCUMENTS

| | | |
|---|---|---|
| 0048461 | 3/1982 | European Pat. Off. . |
| 0050248 | 4/1982 | European Pat. Off. . |
| 0063753 | 11/1982 | European Pat. Off. . |
| 0063817 | 11/1982 | European Pat. Off. . |
| 0071234 | 2/1983 | European Pat. Off. . |
| 108468 | 8/1980 | Japan . |
| 136854 | 10/1981 | Japan . |
| 36109 | 2/1982 | Japan . |
| 1127625 | 9/1968 | United Kingdom . |

OTHER PUBLICATIONS

U.S. patent application Ser. No. 516,856, filed Oct. 22, 1974, Ambient Temperature, Moisture Curable Acrylic-Silane Coating Compositions.

*Primary Examiner*—Michael R. Lusignan
*Attorney, Agent, or Firm*—Thomas M. Breininger

[57] ABSTRACT

Disclosed is a method for coating a substrate comprising the steps of (a) forming a basecoat by coating the substrate with a pigmented basecoating composition; and (b) thereafter forming a topcoat by coating the basecoat with a clear topcoating composition; wherein at least one of the basecoating composition and topcoating composition contains an addition interpolymer having alkoxysilane and/or acyloxysilane moieties, a peak molecular weight of from about 2,000 to about 20,000, and a calculated glass transition temperature of at least about 25° Celsius.

37 Claims, No Drawings

COLOR PLUS CLEAR COATING METHOD UTILIZING ADDITION INTERPOLYMERS CONTAINING ALKOXY SILANE AND/OR ACYLOXY SILANE GROUPS

BACKGROUND OF THE INVENTION

A coating system becoming increasingly popular, particularly in the automotive industry, is one known as "color plus clear." In this system the substrate is coated with one or more applications of a pigmented basecoating composition to form a basecoat which thereafter is coated with one or more applications of an essentially clear topcoating composition to form a topcoat.

However, there are several disadvantages with known color plus clear coating systems. After conventional basecoating compositions are applied to the substrate a rather long period of time, on the order of about 30 minutes or more, may be required between the application of the conventional basecoating composition and the conventional topcoating composition. Such a period is needed to prevent adverse attack by components of the conventional topcoating composition, particularly solvents, on the basecoating composition at the interface of the two, a phenomenon often referred to as strike-in. Strike-in adversely affects the final appearance properties of the coated product. Strike-in is an especially serious problem when metallic-flake pigments are employed in the basecoating composition. Strike-in, among other things, can destroy the desired metallic-flake orientation in the basecoat.

Often, known color plus clear systems based on thermosetting resins require elevated temperatures typically of at least 120° C. for curing. It would be desirable to provide a color plus clear coating method in which relatively low temperatures, for example, below about 82° C., and preferably ambient temperatures, could be utilized. Previous attempts to develop such coating systems resulted in systems which had the disadvantages of being too time consuming and/or energy intensive or resulted in cured films which were deficient in various combinations of physical properties.

In addition to the need for a color plus clear coating system which can utilize low temperature curing, it would be desirable that the system not require the use of organic isocyanates. A number of known color plus clear coating systems involve one or more isocyanates in one or more steps of the coating procedure. Recent studies have suggested that overexposure to organic isocyanates may pose health problems.

In accordance with the present invention, a color plus clear coating system has been developed which can provide an acceptable rate of cure at low or even ambient temperatures and results in coated products in which the films exhibit an excellent combination of good appearance and physical properties such as good solvent resistance, high gloss, excellent gloss retention, good durability, good visual appearance of depth, substantial absence of strike-in, and good metallic pattern control when metallic-flake pigments are employed. Additionally the color plus clear system of the present invention can be utilized with either a reduction of or even elimination of the use of organic isocyanates without sacrificing the attendant advantages of the present invention.

SUMMARY OF THE PRESENT INVENTION

The present invention provides a method for coating a substrate comprising the steps of (a) forming a basecoat by coating the substrate with one or more applications of a pigmented basecoating composition containing an addition interpolymer having alkoxy silane moieties and/or acyloxy silane moieties, a peak molecular weight of from about 2,000 to about 20,000, and a calculated glass transition temperature of at least about 25° Celsius (C.); and (b) thereafter forming a topcoat by coating the basecoat with one or more applications of an essentially clear topcoating composition containing a film-forming thermoplastic resin and/or film-forming thermosetting resin, hereinafter referred to for convenience as "a film-forming resin", which may be the same or different from the addition interpolymer of the basecoating composition.

The present invention also provides a method for coating a substrate comprising the steps of (a) forming a basecoat by coating the substrate with one or more applications of a pigmented basecoating composition containing a film-forming thermoplastic resin and/or film-forming thermosetting resin, referred to above for convenience as "a film-forming resin," which film-forming resin is not an addition interpolymer having alkoxy silane moieties and/or acyloxy silane moieties; and (b) therafter forming a topcoat by coating the basecoat with one or more applications of an essentially clear topcoating composition containing an addition interpolymer having alkoxy silane and/or acyloxy silane moieties, a peak molecular weight of from about 2,000 to about 20,000, and a calculated glass transition temperature of at least about 25° C.

The addition interpolymer containing alkoxy silane moieties and/or acyloxy silane moieties for the basecoating composition, and/or for the topcoating composition, is prepared by reaction of a mixture of monomers consisting essentially of (i) at least one ethylenically unsaturated monomer which does not contain silicon atoms, hereinafter referred to for convenience as an ethylenically unsaturated silicon-free monomer, and (ii) a copolymerizable ethylenically unsaturated alkoxy silane monomer and/or a copolymerizable ethylenically unsaturated acyloxy silane monomer. The basecoating composition, and/or the topcoating composition, containing the addition interpolymer, herein referred to for convenience as the "silane addition interpolymer", may be cured at low temperature, preferably ambient temperature, in the presence of moisture. These silane addition interpolymers are a subject of a copending application to R. Dowbenko and M. E. Hartman filed even date herewith titled "Low Molecular Weight Addition Interpolymers Containing Alkoxysilane and/or Acyloxysilane Groups," and which is hereby incorporated by reference.

DETAILED DESCRIPTION OF THE INVENTION

The basecoating composition and/or topcoating composition containing the silane addition interpolymer is moisture-curable at low temperature, preferably at ambient temperature.

The silane addition interpolymer is prepared by interpolymerizing at least one ethylenically unsaturated silicon-free monomer, which preferably is substantially free of active hydrogen atoms, with a silane monomer selected from an ethylenically unsaturated alkoxy silane monomer and/or an ethylenically unsaturated acyloxy silane monomer.

The ethylenically unsaturated silicon-free monomer employed in making the silane addition interpolymer is any monomer containing at least one >C═C< group which monomer preferably is substantially free of active hydrogen atoms, i.e., monomers which are substantially free of moieties containing active hydrogen atoms such as hydroxyl, carboxyl or unsubstituted amide groups. Monomers containing such functional groups preferably are avoided in preparing the interpolymer since they can cause premature gelation of the interpolymer. However, amounts of such silicon-free monomers containing active hydrogen atoms insufficient to cause premature gelation of the interpolymer, i.e., at or before a peak molecular weight of up to about 20,000 is obtained, may be utilized in preparing the interpolymer. As used herein, an amount of silicon-free monomers considered to be substantially free of active hydrogen atoms would represent less than 10% by weight of silicon-free monomers containing active hydrogen atoms based on the total weight of silicon-free monomers. Preferably less than 0.5% by weight of such silicon-free monomers containing active hydrogen atoms, based on the total weight of silicon-free monomers, is employed.

As indicated above, the silane addition interpolymer for the method of the invention is formed from at least two components, i.e., an ethylenically unsaturated silicon-free monomer containing at least one >C═C< group and which is preferably substantially free of active hydrogen atoms and an ethylenically unsaturated compound selected from an alkoxysilane monomer, an acyloxysilane monomer or a mixture thereof. The term "ethylenically unsaturated" is employed in a broad sense and is intended to encompass, for example, vinyl compounds, acrylic compounds and methacrylic compounds. The basic criteria with respect to the ethylenically unsaturated monomer are that it contains at least one >C═C< group, that it is copolymerizable without gelation with the silane monomer component up to a peak molecular weight of about 20,000, and that it does not otherwise preclude the utilization of the finished interpolymer.

Examples of suitable ethylenically unsaturated silicon-free monomers employed in forming the silane addition interpolymer herein include the alkyl acrylates, such as methyl acrylate, ethyl acrylate, butyl acrylate, propyl acrylate, and 2-ethylhexyl acrylate; the alkyl methacrylates, such as methyl methacrylate, butyl methacrylate, 2-ethylhexyl methacrylate, decyl methacrylate, and lauryl methacrylate; and unsaturated nitriles, such as acrylonitrile, methacrylonitrile and ethacrylonitrile. Still other unsaturated monomers which can be used include: vinyl aromatic hydrocarbons such as styrene, alpha methyl styrene, and vinyl toluene; vinyl acetate; vinyl chloride; and epoxy functional monomers such as glycidyl methacrylate.

In practice, in order to produce desirable properties in the silane addition interpolymer, it is preferred to use combinations of ethylenically unsaturated silicon-free monomers which form hard polymer segments, such as styrene, vinyl toluene and alkyl methacrylates having from 1 to 4 carbon atoms in the alkyl group with monomers which form soft polymer segments, such as the alkyl esters of acrylic or methacrylic acid, the alkyl groups having from 1 to 13 carbon atoms in the case of acrylic esters and from 5 to 16 carbon atoms in the case of methacrylic esters. Illustrative of monomers which form soft polymer segments are ethyl acrylate, butyl acrylate, 2-ethylhexyl acrylate, 2-ethylhexyl methacrylate, decyl methacrylate, and lauryl methacrylate. In addition to the hardening and softening monomers, as previously indicated, other monomers such as vinyl acetate, vinyl chloride, vinyl toluene, and acrylonitrile may be included to achieve specific properties in the interpolymer. The silane addition interpolymer is formed from about 50 percent to about 95 percent, preferably from about 70 percent to about 90 percent, by weight of these ethylenically-unsaturated silicon-free monomers.

The other component of the silane addition interpolymer is an organosilane compound, specifically an ethylenically unsaturated alkoxysilane, an ethylenically unsaturated acyloxysilane or a mixture thereof. Alkoxysilanes which can suitably be employed and are preferred are the acrylatoalkoxysilanes, such as gamma-acryloxypropyltrimethoxysilane and the methacrylatoalkoxysilanes, such as gamma-methacryloxypropyltrimethoxysilane, gamma-methacryloxypropyltriethoxysilane and gamma-methacryloxypropyltris(2-methoxyethoxy)silane. Among the above listed alkoxysilanes, gamma-methacryloxypropyltrimethoxysilane is especially preferred due to its greater reactivity. Other alkoxysilanes are the vinylalkoxysilanes such as vinyltrimethoxysilane, vinyltriethoxysilane and vinyltris(2-methoxyethoxy)silane. Ethylenically unsaturated acyloxysilanes include acrylato-, methacrylato- and vinyl-acetoxysilanes, such as vinylmethyldiacetoxysilane, acrylatopropyltriacetoxysilane, and methacrylatopropyltriacetoxysilane. The silane addition interpolymer contains from about 5 percent to about 50 percent by weight, preferably from about 10 percent to about 30 percent by weight, of the above described silane monomer.

The silane addition interpolymer is formed by interpolymerizing the ethylenically unsaturated silicon-free monomer or monomers with the ethylenically unsaturated silane monomers in the presence of a vinyl polymerization catalyst. The preferred catalysts are azo compounds such as, for example, alpha alpha'-azobis(isobutyronitrile); peroxides such as benzoyl peroxide and cumene hydroperoxide and tertiary butyl peracetate, isopropyl percarbonate, butyl isopropyl peroxy carbonate and similar compounds. The quantity of catalyst employed can be varied considerably; however, in most instances, it is desirable to utilize from about 0.1 to 10 percent based on the weight of monomer solids. A chain modifying agent or chain transfer agent is ordinarily added to the polymerization mixture. The mercaptans, such as dodecyl mercaptan, tertiary dodecyl mercaptan, octyl mercaptan, hexyl mercaptan and the mercaptoalkyl trialkoxysilane, e.g., 3-mercaptopropyltrimethoxysilane, may be used for this purpose as well as other chain transfer agents such as cyclopentadiene, allyl acetate, allyl carbamate, and mercaptoethanol. The mercaptoalkyl trialkoxysilanes have been found to be especially useful where increased durability is needed. Thus, a level the mercaptoalkyl trialkoxysilane at a level of 0.5 to 15 parts per 100 parts monomer substantially increases the durability of coatings based on silane addition interpolymer.

It is particularly important that the peak molecular weight, as determined by gel permeation chromatography, of the silane addition interpolymer when in the pigmented basecoating composition range from about 2,000 to about 20,000, preferably from about 10,000 to about 18,000. If the peak molecular weight is too low, the time required for drying or curing the basecoating composition to a degree at least sufficient to allow application of the topcoating composition without undesirable strike-in is undesirably long. An advantage of the method of the invention utilizing the silane addition interpolymer for the basecoating composition is that the topcoating composition can be applied to the basecoat after the basecoat has remained at ambient temperature in atmospheric moisture for a short period of time, sometimes as short as 2 minutes, without, for example, the topcoating composition undesirably striking-in to the basecoat.

On the other hand, if the peak molecular weight of the silane addition interpolymer of the basecoating composition is too high, the spray application properties of the composition at a desirably high solids content is adversely affected. While a basecoating composition containing the silane addition interpolymer can be applied to any conventional method such as brushing, dipping, flow coating, spraying, etc., an advantage of the method of the present invention is that it allows a basecoating composition containing silane addition interpolymer to be spray applied at a high solids content, i.e., 40 percent by weight total solids, preferably 50 percent by weight total solids and higher. Moreover, conventional spraying techniques and equipment can be utilized.

When the topcoating composition contains a silane addition interpolymer, the peak molecular weight of the silane addition interpolymer generally ranges from about 2,000 to about 20,000, preferably from about 2,000 to about 15,000, and more preferably from about 4,000 to about 10,000. The peak molecular weight of a silane addition interpolymer for the topcoating composition can be rather low since the degree of cure to prevent, for example, strike-in is not an important consideration with respect to the topcoating composition.

Conventional techniques for applying coating compositions to substrates such as those described previously can be employed to apply the topcoating composition in the present invention. However, spraying is the usual method of application. Preferably, the basecoating composition and topcoating composition are spray applied to the substrate at high solids contents, i.e., 40 percent by weight total solids, preferably 50 percent by weight total solids and higher. Moreover, compositions containing silane addition interpolymer can be spray applied at the aforesaid high solids contents utilizing conventional spraying techniques and equipment.

The polymerization reaction for the mixture of monomers to prepare the silane addition interpolymer is carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents which may be utilized in the polymerization of the monomers include virtually any of the organic solvents heretofore employed in preparing conventional acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms including ethanol, propanol, isopropanol, and butanol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha.

Choice of the specific ethylenically unsaturated silicon-free monomers and ethylenically unsaturated silane monomers is based on the need for the silane addition interpolymer for the basecoating composition to have a calculated glass transition temperature (Tg) of at least about 25° C., preferably from about 30° C. to about 105° C. The Tg of a silane addition interpolymer for the topcoating composition should be at least about 25° C., and preferably at least about 45° C. The Tg is calculated using a generally known equation as found, for example, in "Fundamentals of Acrylics" by W. H. Brendley, Jr., *Paint and Varnish Production,* Vol. 63 No. 7, July 1973, pages 19–27. If the glass transition temperatures of the silane addition interpolymers are too low, for example less than about 25° C., the physical properties of the cured films for protective coatings applications are adversely affected. Such physical properties include, for example, the gloss retention of the topcoat films which is a measure of long term durability, the mar resistance of the films, the abrasion resistance of the films, and the desired hardness of the films for protective coatings applications.

The silane addition interpolymers serve as film-forming resins in the color plus clear coating method of the invention. Typically, the basecoating composition, and/or the topcoating composition, contains a silane addition interpolymer, catalyst and, for application purposes, often a solvent. The cure accelerating catalyst may be an organic acid, such as, for example, p-toluenesulfonic acid, and n-butylphosphoric acid, or a metallic salt of an organic acid, such as, for example, tin naphthenate, tin benzoate, tin octoate, tin butyrate, dibutyltin dilaurate, dibutyltin diacetate, iron stearate, and lead octoate, or an organic base, such as, for example, isophorone diamine, methylene dianiline, and imidazole. The preferred cure accelerating catalysts are the organotin salts, such as dibutyltin dilaurate.

The specific amounts of cure accelerating catalyst which are included in the compositions containing silane addition interpolymer vary considerably depending upon factors such as the rate of cure desired, the specific composition of the silane addition interpolymer component, the amount of moisture present in the ambient atmosphere and the like. However, in general, the coating compositions containing silane addition interpolymer utilized in the method of the invention may contain from about 0.1 parts to about 5 parts by weight of cure accelerating catalyst based on 100 parts by weight of silane addition interpolymer solids.

In addition to the foregoing components, the coating compositions containing silane addition interpolymer employed in the method of this invention may contain optional ingredients, including various pigments of the type ordinarily utilized in coatings of this general class. In addition, various fillers; plasticizers, antioxidants; mildewcides and fungicides; surfactants; various flow control agents including, for example, thixotropes and additives for sag resistance and/or pigment orientation based on polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932 the disclosures of which are hereby incorporated by reference; and other such formulating additives may be employed in some instances. A primary thiol, e.g., dodecylmercaptan, isooctylthioglycolate, and the mercaptoalkyl trialkoxysilanes, surprisingly, when included in the coating compositions containing silane addition interpolymer enhances the gloss of the cured coatings. A level of about 0.1 parts to about 5 parts primary thiol per 100 parts silane addition interpolymer provides the enhanced gloss effect. A composition containing the silane addition interpolymer is ordinarily applied in an organic solvent which may be any solvent or solvent mixture in which the materials employed are compatible and soluble to the desired extent.

The method of the invention may be employed utilizing a wide variety of substrates such as wood, metals, glass, cloth, plastics, foams and the like, as well as over primers. The method of the invention is especially useful for coating automobiles, particularly for automobile refinishing.

As indicated, the coating compositions containing silane addition interpolymer can be cured by heating or typically by exposure to atmospheric moisture at ambient temperature. Thus, once the silane addition interpolymer component and cure accelerating catalyst component are brought into contact with each other, as by mixing, and exposed to the ambient atmosphere, the composition will begin to cure. Accordingly, it is desirable in some instances to prepare the compositions containing silane addition interpolymer in the form of a two package system, i.e., one package containing the addition interpolymer component along with any desired optional ingredients and a second package containing the cure accelerating catalyst component. The silane addition interpolymer component of the composition in the absence of the cure accelerating catalyst exhibits good pot life, i.e., 6 months or more when stored at temperatures of 120° F. (48.9° C.) or less. When it is desired to coat a substrate with the composition of silane addition interpolymer, the components of the two packages are merely mixed together just prior to application and the resulting composition applied to the substrate by one of the methods described above.

As indicated previously at least one of the basecoating composition and topcoating composition contains a film-forming resin a silane addition interpolymer either as the sole film-forming resin or optionally in combination with an additional film-forming thermoplastic resin and/or thermosetting resin. Examples of such additional film-forming thermoplastic and/or thermosetting resins include the generally known cellulosics, acrylics, aminoplasts, urethanes, polyesters, epoxies or mixtures thereof. Additionally when only one of the basecoating and topcoating compositions contains the silane addition interpolymer, the other contains a film-forming resin typically selected from the generally known cellulosics, acrylics, aminoplasts, urethanes, polyesters, epoxies or mixtures thereof mentioned immediately above. These film-forming resins can be employed optionally in combination with various ingredients generally known for use in coating compositions containing film-forming resins of these general classes. Examples of these various ingredients include: fillers; plasticizers; antioxidants, mildewcides and fungicides, surfactants; various flow control agents including, for example, thixotropes and also additives described previously for sag resistance and/or pigment orientation based on polymer microparticles.

Cellulosics refer to the generally known thermoplastic polymers which are derivatives of cellulose, examples of which include: nitrocellulose; organic esters and mixed esters of cellulose such as cellulose acetate, cellulose propionate, cellulose butyrate, and preferably cellulose acetate butyrate (CAB); and organic ethers of cellulose such as ethyl cellulose.

Acrylic resins refer to the generally known addition polymers and copolymers of acrylic and methacrylic acids and their ester derivatives, acrylamide and methacrylamide, and acrylonitrile and methacrylonitrile. Additional examples of acrylic monomers which can be addition polymerized to form acrylic resins include the alkyl acrylates and the alkyl methacrylates previously set forth under the description of suitable ethylenically unsaturated silicon-free monomers for preparing the addition interpolymer containing alkoxy silane and/or acyloxy silane moieties some further examples of which include hydroxyethyl acrylate, hydroxypropyl acrylate, hydroxyethyl methacrylate, and hydroxypropyl methacrylate. Moreover, where desired, various other unsaturated monomers can be employed in the preparation of the acrylic resins examples of which include: vinyl aromatic hydrocarbons such as styrene, alpha methyl styrene, and vinyl toluene; vinyl acetate; vinyl chloride; and unsaturated epoxy functional monomers such as glycidyl methacrylate.

Aminoplast resins refer to the generally known condensation products of an aldehyde with an amino- or amido-group containing substance examples of which include the reaction products of formaldehyde, acetaldehyde, crotonaldehyde, benzaldehyde and mixtures thereof with urea, melamine, or benzoguanimine. Preferred aminoplast resins include the etherified products obtained from the reaction of alcohols and formaldehyde with urea, melamine, or benzoguanimine. Examples of suitable alcohols for preparing these etherified products include: methanol, ethanol, propanol, butanol, hexanol, benzylalcohol, cyclohexanol, 3-chloropropanol, and ethoxyethanol.

Urethane resins refer to the generally known thermosetting or thermoplastic urethane resins prepared from organic polyisocyanates and organic compounds containing active hydrogen atoms as found for example in hydroxyl, and amino moieties. Some examples of urethane resins typically utilized in one-pack coating compositions include: the isocyanate-modified alkyd resins sometimes referred to as "uralkyds"; the isocyanate-modified drying oils commonly referred to as "urethane oils" which cure with a drier in the presence of oxygen in air; and isocyanate-terminated prepolymers typically prepared from an excess of one or more organic polyisocyanates and one or more polyols including, for example, simple diols, triols and higher alcohols, polyester polyols and polyether polyols. Some examples of systems based on urethane resins typically utilized as two-pack coating compositions include an organic polyisocyanate or isocyanate-terminated prepolymer (first pack) in combination with a substance (second pack) containing active hydrogen as in hydroxyl or amino groups along with a catalyst (e.g., an organotin salt such as dibutyltin dilaurate or an organic amine such as triethylamine or 1,4-diazobicyclo-(2:2:2) octane). The active hydrogen-containing substance in the second pack typically is a polyester polyol, a polyether polyol, or an acrylic polyol known for use in such two-pack urethane resin systems. Many coating compositions based on urethanes (and their preparation) are described extensively in Chapter X Coatings, pages 453–607 of Polyurethanes: Chemistry and Technology, Part II by H. Saunders and K. C. Frisch, Interscience Publishers (N.Y., 1964).

Polyester resins are generally known and are prepared by conventional techniques utilizing polyhydric alcohols and polycarboxylic acids. Examples of suitable polyhydric alcohols include: ethylene glycol; propylene glycol; diethylene glycol; dipropylene glycol; butylene glycol; glycerol; trimethylolpropane; pentaerythritol; sorbitol, 1,6-hexanediol; 1,4-cyclohexanediol; 1,4-cyclohexanedimethanol; 1,2-bis(hydroxyethyl)cyclohexane; and 2,2-dimethyl-3-hydroxypropyl-2,2-dimethyl-3-hydroxypropionate. Examples of suitable polycarboxylic acids include: phthalic acid; isophthalic acid; terephthalic acid; trimellitic acid; tetrahydrophthalic acid; hexahydrophthalic acid; tetrachlorophthalic acid; adipic acid; azelaic acid; sebacic acid; succinic acid; maleic acid; glutaric acid; malonic acid; pimelic acid; suberic acid; 2,2-dimethylsuccinic acid; 3,3-dimethylglutaric acid; 2,2-dimethylglutaric acid; maleic acid; fumaric acid; and itaconic acid. Anhydrides of the above acids, where they exist, can also be employed and are encompassed by the terms "polycarboxylic acid." In addition, certain substances which react in a manner similar to acids to form polyesters are also useful. Such substances include lactones such as caprolactone, propylolactone and methyl caprolactone, and hydroxy acids such as hydroxy caproic acid and dimethylol propionic acid. If a triol or higher hydric alcohol is used, a monocarboxylic acid, such as acetic acid and benzoic acid may be used in the preparation of the polyester resin. Moreover, polyesters are intended to include polyesters modified with fatty acids or glyceride oils of fatty acids (i.e., conventional alkyd resins). Alkyd resins typically are produced by reacting the polyhydric alcohols, polycarboxylic acids, and fatty acids derived from drying, semi-drying, and non-drying oils in various proportions in the presence of a catalyst such as litharge, sulfuric acid, or a sulfonic acid to effect esterification. Examples of suitable fatty acids include saturated and unsaturated acids such as stearic acid, oleic acid, ricinoleic acid, palmitic acid, linoleic acid, linolenic acid, licanic acid, elaeostearic acid, and clupanodonic acid.

Epoxy resins, often referred to simply as "epoxies", are generally known and refer to compounds or mixtures of compounds containing more than one 1,2-epoxy group of the formula

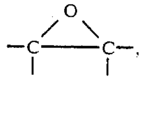

i.e., polyepoxides. The polyepoxides may be saturated or unsaturated, aliphatic, cycloaliphatic, aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and the hydrogenated derivatives thereof. The polyglycidyl ethers of polyphenols of various molecular weights may be produced, for example, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone, and pyrocatechol.

Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate.

Many additional examples of epoxy resins are described in the Handbook of Epoxy Resins, Henry Lee and Kris Neville, 1967, McGraw Hill Book Company.

Pigments suitable for the pigmented basecoating composition include a wide variety of pigments generally known for use in coating compositions. Suitable pigments include both metallic-flake pigments and various white and colored pigments.

Examples of metallic-flake pigments include the conventional metallic flakes such as aluminum flakes, nickel flakes, tin flakes, silver flakes, chromium flakes, stainless steel flakes, gold flakes, copper flakes and combinations thereof. Of the metallic-flake pigments, nonleafing aluminum flakes are preferred.

Examples of white and colored pigments include generally known pigments based on metal oxides; metal hydroxides; metal sulfides; metal sulfates; metal carbonates; carbon black; china clay; phthalo blues and greens, organo reds, and other organic dyes.

In the method of the invention the pigmented basecoating composition, preferably containing silane addition interpolymer, is first applied to the substrate. The pigmented basecoating composition, depending on the choice of thermoplastic and/or thermosetting resin or silane addition interpolymer, may be dried or cured at ambient temperature or with applied heat to a degree at least sufficient to allow the clear topcoating composition to be applied to the basecoat without undesirable strike-in. When optional heat curing is employed, it is sometimes desirable to allow the basecoating composition to flash for up to about 30 minutes at ambient temperature. Such solvent flashing may be utilized with either basecoating compositions containing thermoplastic resins or with basecoating compositions containing thermosetting resins (i.e., those which involve some degree of crosslinking during cure). In particular, a basecoating composition based on a silane addition interpolymer typically is cured at ambient temperature; although curing by the application of heat may be utilized. However, a distinct advantage of the method of the present invention is that the topcoating composition may be applied essentially "wet on wet," i.e., without first drying or curing the basecoat and with a minimum of flash time for the basecoat, for example of only about 2 to about 5 minutes at ambient temperature, before the topcoating composition is applied to the basecoat.

The topcoating composition is applied directly over the basecoat. Depending for example on the choice of thermoplastic and/or thermosetting resin or silane addition interpolymer, the topcoating composition is air dried or cured at ambient temperature or with applied heat to form the topcoat. An advantage of utilizing topcoating compositions containing silane addition interpolymer is that they can be cured to durable, transparent, high gloss films under ambient conditions of temperature and moisture. Additionally, these moisture-cured films exhibit excellent gloss retention.

The topcoating composition is formulated so that when it is applied to the basecoat, it forms a clear topcoat so that the pigmentation of the basecoat will be visible through the topcoat. It should be understood that the topcoat, while being transparent, may contain small amounts of dyes and/or tints to modify the overall appearance where desired. However, it is usually preferable not to employ even small amounts of dyes and/or tints in the topcoating composition. Although the topcoating composition may contain transparent extender pigments and optionally a small amount of coloring pigment, it should not contain so much coloring pigment that it interferes with the general transparency of the topcoat. Usually, it is preferable not to utilize even small amounts of coloring pigment in the topcoating composition.

Thermoplastic topcoating compositions usually are hardened by evaporation of the volatile solvent or dispersant.

Thermosetting topcoating compositions may be crosslinked (cured) in various ways, typically at temperatures ranging from about 20° C. to about 260° C. Some film-forming resins such as the air-curable alkyds may be cured by exposure to atmospheric oxygen. When a crosslinking agent is present (i.e., an agent other than a silane addition interpolymer which itself contains moisture curable alkoxy silane and/or acyloxy silane groups) the topcoating compositions may be cured by heating. The curing temperatures may vary widely, but usually are in the range of from about 80° C. to about 150° C. Similarly the curing times may be subject to wide variation but usually are in the range of from about 10 minutes to about 45 minutes. As a rule, an increase in the curing temperature for the topcoating composition permits a reduction in the curing time. Where a plurality of superimposed basecoats and/or topcoats are to be applied, each coat may be dried or cured prior to application of the next coating composition. It is preferable, however, to utilize coating systems which will permit the application of two or more superimposed coatings which can be dried or cured together in a single drying or curing operation.

An advantage of employing a silane addition interpolymer, as described previously, for the topcoating composition, is that such a topcoating composition may be cured at ambient temperature in atmospheric moisture in a relatively short period of time.

The Examples which follow are submitted for the purpose of further illustrating the nature of the present invention and should not be regarded as a limitation on the scope thereof.

As used in the body of the specification, examples, and claims, all percents, ratios and parts are by weight unless otherwise specifically indicated.

EXAMPLE I

This example illustrates the preparation of a silane addition interpolymer, especially useful in a basecoating composition as illustrated in Example III. The following monomers are used:

| | Percent by Weight |
|---|---|
| Methyl methacrylate | 40.0 |
| Butyl methacrylate | 7.5 |
| 2-ethylhexyl acrylate | 10.0 |
| Styrene | 25.0 |
| Gamma-methacryloxy-propyltrimethoxysilane | 17.5 |

A reaction vessel equipped with condenser, stirrer, thermometer and means for maintaining a nitrogen blanket is charged with 336.0 parts butyl acetate, 144.0 parts VM & P naphtha, and 96.0 parts toluene. The contents of the vessel are then heated to reflux, about 119° C., while under a nitrogen blanket and agitation. Three charges are next made simultaneously while maintaining the vessel at reflux conditions. Charge I consists of a mixture of 896.0 parts methyl methacrylate, 168.0 parts butyl methacrylate, 224.0 parts 2-ethylhexyl acrylate, 560.0 parts styrene and 392.0 parts gamma-methacryloxypropyltrimethoxysilane. Charge II consists of 192.0 parts butyl acetate and 44.8 parts di-tert-butyl peroxide catalyst. Charge III consists of 192.0 parts butyl acetate and 56.0 parts 3-mercaptopropyltrimethoxysilane chain transfer agent. The three charges are completed after 2 hours, at which time another 9.0 parts di-tert-butyl peroxide catalyst is added. The vessel's contents are maintained at reflux for another hour. Still another 9.0 parts of the peroxide catalyst is added and the vessel's contents is allowed to reflux for 1.5 hours. The heat is removed from the vessel after the 1.5 hours and allowed to cool.

The resultant product mixture is thinned with 400 parts butyl acetate, 80.0 parts VM & P naptha and 53.3 parts toluene. The mixture has a solids content of 58.2%, a viscosity of 18.23 Stokes and an acid value of 0.1.

An analysis of the silane addition interpolymer shows it to have a peak molecular weight of 17,400 as determined by gel permeation chromatography, using a styrene standard and a calculated Tg of 55° C.

EXAMPLE II

The following monomers are used to make a silane addition interpolymer, the use of which is illustrated in Example III:

| | Percent by Weight |
|---|---|
| Methyl methacrylate | 40 |
| Butyl acrylate | 20 |
| Styrene | 25 |
| Gamma-methacryloxy-propyltrimethoxysilane | 15 |

A reaction vessel equipped as in Example I is initially charged with 336.0 parts butyl acetate, 144.0 parts VM & P naphtha and 96.0 parts toluene and then heated to reflux, about 119° C. A nitrogen blanket is provided and maintained throughout the reaction. After the solvent has reached reflux conditions three charges are simultaneously added over a two hour time period. Charge I consists of 896.0 parts methyl methacrylate, 448.0 parts butyl acrylate, 560.0 parts styrene and 336.0 parts gammamethacryloxypropyltrimethoxysilane. Charge II consists of 192.0 parts butyl acetate and 112.0 parts di-tert-butyl peroxide catalyst. Charge III consists of 192.0 parts butyl acetate and 112.0 parts 3-mercaptopropyltrimethoxysilane. After the three charges are added, 9.0 parts of the peroxide catalyst is added and the reaction mixture held at reflux for 1 hour. Another 9.0 parts of the peroxide catalyst is added and the mixture is held for 1.5 hours at reflux.

An analysis of the resultant product shows the solids content of the silane addition interpolymer is 66.9%, the viscosity of the product is 26.8 Stokes and the acid value of the product is 0.1.

The silane addition interpolymer has a peak molecular weight of 6800 as determined by gel permeation chromatography, using a styrene standard and a calculated Tg of 50° C.

EXAMPLE III

This example illustrates the advantages achieved when a basecoating composition containing a silane addition interpolymer is applied to a substrate, flashed for a short period of time, and has applied to it a clear topcoat. The formulations of the basecoating composition and clearcoating composition are as set forth in the following TABLES 1 and 2 respectively.

TABLE 1

| Basecoating Composition | Percent by Weight |
|---|---|
| Acrylic silane solution[1] | 18.0 |
| Pigment paste[2] | 4.7 |
| UV absorber[3] | 0.3 |
| Polysiloxane solution (0.5% solids)[4] | 0.3 |
| Pattern control agent[5] | 3.8 |
| Triethylorthoformate | 0.6 |
| Dibutyltin dilaurate solution (10% solids) | 1.5 |
| Butyl acetate | 13.6 |
| Acetone | 19.0 |
| Toluene | 26.8 |
| Xylene | 9.2 |
| Diethylene glycol monobutyl ether acetate | 2.2 |

[1]As made in Example I.
[2]The pigment paste has a pigment weight concentration (PWC) of 62.3% and is composed of 31.5% by weight pigment solids, 19.1% by weight acrylic copolymer resin solids, and 49.4% by weight solvents. The pigment solids are composed of 85% by weight nonleafing aluminum flakes and 15% by weight phthalo blue. The pigments are dispersed in the acrylic copolymer resin having a peak molecular weight of 20,000 determined by gel permeation chromatography (54% by weight methyl methacrylate, 10% by weight butyl methacrylate, 10% by weight 20ethylhexyl acrylate, 25% by weight styrene, and 1% by weight acrylica cid which has been partially reacted with hydroxyethyleneimine) at 48% by weight resin solids in a mixture of solvents (8.92% by weight toluene, 12.11% by weight naphtha, and 78.97% by weight butylacetate).
[3]Available from Ciba-Geigy Corp. as TINUVIN 328.
[4]The polysiloxane is available from Dow Corning Corp. as DC 200, 135 csk.
[5]Prepared as described in U.S. Pat. No. 4,147,688, Example II, herein incorporated by reference.

TABLE 2

| Clearcoating Composition | Percent by Weight |
|---|---|
| Silane addition interpolymer solution[1] | 49.6 |
| UV absorber[2] | 0.7 |
| Polysiloxane solution[3] | 0.9 |
| Triethylorthoformate | 1.7 |
| Dibutyltin dilaurate solution (10% solids) | 2.5 |
| Butyl acetate | 7.8 |
| Acetone | 10.8 |
| Toluene | 15.2 |
| Xylene | 5.1 |
| Ethylene glycol monoethyl ether acetate | 3.6 |
| Diethylene glycol monobutyl ether acetate | 2.1 |

[1]As made in Example II.
[2]As used in the basecoating composition.
[3]As used in the basecoating composition.

The above compositions are each applied at 21° C. and 40% relative humidity to a previously painted used car. The compositions are spray applied in amounts sufficient to give a 0.5 mil dry film thickness of basecoat and 1.5 mil dry film thickness of clear coat. The clear coat application is begun about 5 minutes after the basecoat application is completed.

The appearance of the resultant coatings is excellent thereby showing the ability of the basecoat to receive a subsequent coating shortly after its own application. The film properties of the coatings are also excellent as evidenced by the following tests and results set forth in the following Table 3.

TABLE 3

| | |
|---|---|
| Tape-free time | 47 hours |
| 20° gloss | 87 (after 24 hours)<br>87 (after 144 hours) |
| Sward hardness | 14 (after 24 hours)<br>30 (after 144 hours) |
| Pencil hardness | 3B (after 24 hours)<br>HB (after 144 hours) |
| Three minute gasoline soak | Good (after 24 hours)<br>Excellent (after 144 Hours) |
| Distinctness of image | 65 (after 24 hours)<br>60 (after 144 hours) |
| Percent gloss retention | 90 (after 12 months in Florida) |

EXAMPLE IV

This example illustrates the method of applying a high solids clear topcoating composition containing a silane addition interpolymer over a basecoat prepared from a high solids, pigmented basecoating composition containing a silane addition interpolymer.

A basecoating composition is prepared consisting of the ingredients in the relative amounts set forth in the following TABLE 4.

TABLE 4

| Basecoating Composition | Percent by Weight |
|---|---|
| Silane addition interpolymer solution[1] | 63.9 |
| Nonleafing aluminum pigment paste[2] | 11.5 |
| Polysiloxane solution[3] | 1.0 |
| Ultraviolet light (UV) absorber[4] | 1.0 |
| Triethylorthoformate | 2.5 |
| Dibutyltin dilaurate solution[5] | 6.5 |
| Butyl acetate | 13.6 |

[1]As prepared in Example II.
[2]Contains 65% by weight nonleafing aluminum flakes in hydrocarbon solvents available as Sparkle Silver 5500 from Siberline Manufacturing Company, Inc.
[3]The polysiloxane is available from Dow Corning Corp. as DC 200, 135 csk. Dissolved in xylene to give a 0.5 percent polysiloxane content.
[4]Available from Ciba-Geigy Corp. as TINUVIN 328.
[5]A solution of 10 percent by weight dibutyltin dilaurate in xylene.

The basecoating composition set forth in TABLE 4 has a total solids content of 50% by weight and a pigment weight concentration (PWC) of 15 percent by weight.

The basecoating composition is spray applied to 24 gauge cold rolled steel panels treated with BONDERITE 40 and primed with a two component epoxy/-polyamide primer available as DP 40/401 from DITZLER Automotive Finishes, PPG INDUSTRIES, INC., to form a basecoat. The basecoat is allowed to flash for 5 minutes at room temperature. Immediately thereafter, a clear topcoating composition consisting of the ingredients set forth in the following TABLE 5 is spray applied at 50% by weight total solids to the basecoat to form a clear topcoat.

TABLE 5

| Topcoating Composition | Percent by Weight |
|---|---|
| Silane addition interpolymer solution[1] | 75.2 |
| Polysiloxane solution[2] | 1.3 |
| Ultraviolet light stabilizer[3] | 1.0 |
| Triethylorthoformate | 2.5 |
| Dibutyltin dilaurate solution[4] | 3.7 |
| Butyl acetate | 16.3 |

[1]As prepared in EXAMPLE II.
[2]As described in footnote 3 to TABLE 4.
[3]As described in footnote 4 to TABLE 4.
[4]As described in footnote 5 to TABLE 4.

The basecoat and topcoat are allowed to moisture cure at room temperature for 24 hours under ambient atmospheric conditions to a dry film thickness of the basecoat of 1.0 mil and a dry film thickness of the topcoat of 3.5 mils.

The properties of the resulting cured composite basecoat/topcoat are as set forth in the following TABLE 6.

TABLE 6

| | |
|---|---|
| 20° Gloss | 81 |
| Distinctness of Image (DOI) | 50 |
| Sward Hardness | 6 |
| Pencil Hardness | B |
| Resistance to gasoline[1] | Excellent |

[1]Determined by immersing the cured coated panel in unleaded gasoline for 3 minutes after which the panel is removed and the gasoline is allowed to evaporate for 1 minute before the coated panel is visually inspected.

EXAMPLE V

This example illustrates the method of applying a clear topcoating composition which does not contain a silane addition interpolymer over a basecoat prepared from a high solids, pigmented basecoating composition containing a silane addition interpolymer.

A basecoating composition is prepared consisting of the ingredients in the relative amounts set forth in TABLE 4 above. The basecoating composition has a total solids content of 50% by weight and a pigment weight concentration (PWC) of 15 percent by weight.

The basecoating composition is spray applied to the same type of treated and primed steel panel as described in EXAMPLE IV to form a basecoat. The basecoat is allowed to flash for 5 minutes at room temperature. Immediately thereafter, a clear topcoating composition is spray applied to the basecoat to form a clear topcoat. The clear topcoating composition is a two component acrylic urethane composition available as DAU 82/DAU 2 from DITZLER Automotive Finishes, PPG INDUSTRIES, INC.

The basecoat and topcoat are allowed to cure at room temperature for 24 hours under ambient atmospheric conditions to a dry film thickness of the basecoat of 1.0 mil and a dry film thickness of the topcoat of 2.0 mils.

The properties of the resulting cured composite basecoat/topcoat are as set forth in the following TABLE 7.

TABLE 7

| | |
|---|---|
| 20° Gloss | 65 |
| Distinctness of Image (DOI) | 30 |
| Sward Hardness | 6 |
| Pencil Hardness | 2B |
| Resistance to gasoline[1] | Excellent |

[1]Determined using the same procedure described in footnote 1 to TABLE 6.

EXAMPLE VI

This example illustrates the method of the invention employing heat curing.

A basecoating composition is prepared consisting of the ingredients in the relative amounts set forth in the following TABLE 8.

TABLE 8

| Basecoating Composition | Percent by Weight |
|---|---|
| Silane addition interpolymer solution[1] | 20.9 |
| Nonleafing aluminum pigment paste[2] | 3.7 |
| Polysiloxane solution[3] | 0.3 |
| Ultraviolet light (UV) absorber[4] | 0.3 |
| Triethylorthoformate | 0.6 |
| Anhydrous ethanol | 0.6 |
| Butyl acetate | 15.0 |
| Dibutyltin dilaurate solution[5] | 1.7 |
| Acetone | 24.7 |
| Toluene | 24.2 |
| Xylene | 8.0 |

[1]As prepared in EXAMPLE I.
[2]As described in footnote 2 to TABLE 4.
[3]As described in footnote 3 to TABLE 4.
[4]As described in footnote 4 to TABLE 4.
[5]Contains 10% by weight dibutyltin dilaurate in a mixture of solvents consisting of 43.5% by weight acetone, 42.4% by weight toluene and 14.0% by weight xylene.

The basecoating composition is spray applied to the same type of treated and primed steel panel as described in EXAMPLE IV to form a basecoat. The basecoat is allowed to flash for 5 minutes at room temperature. Immediately thereafter, a clear topcoating composition is spray applied to the basecoat to form a clear topcoat. The clear topcoating composition is Corostar 434 Acrylic Urethane, a two component clear coating composition available from Peintures Corona, Department Carrosserie, La Courneuve, France.

The resulting basecoat and topcoat are allowed to flash at room temperature for 30 minutes and thereafter are force-dried for 45 minutes in air at 140° F. (60.0° C.) to a dry film thickness of the basecoat of 0.7 mils and a dry film thickness of the topcoat of 1.5 mils.

The properties of the resulting cured composite basecoat/topcoat are as set forth in the following TABLE 9. These properties are measured after drying at room temperature for an additional 24 hours and 96 hours respectively.

TABLE 9

| | 24 Hours | 96 Hours |
|---|---|---|
| 20° Gloss | 89 | 88 |
| Distinctness of Image (DOI) | 45 | 45 |
| Sward Hardness | 22 | 34 |
| Pencil Hardness | 2B | HB |
| Resistance to gasoline[1] | Good | Excellent |

[1]Determined using the same procedure described in footnote 1 to TABLE 6.

EXAMPLE VII

The silane addition interpolymer illustrated in this example is used in the coating compositions of EXAMPLE VIII. The silane addition interpolymer is prepared from the following monomers:

| | Percent by Weight |
|---|---|
| Methyl methacrylate | 40.0 |
| Butyl methacrylate | 10.0 |
| Butyl acrylate | 10.0 |
| Styrene | 25.0 |
| Gamma-methacryloxypropyltrimethoxysilane | 15.0 |

The process utilized for preparing the interpolymer is that illustrated in EXAMPLE II. Following this process there is obtained a reaction product having a solids content of 67.7% by weight, a viscosity of 45.6 Stokes and an acid value of 0. The silane addition interpolymer has a calculated Tg of 65° C. and a peak molecular weight of 6800 as determined by gel permeation chromatography using a styrene standard.

EXAMPLE VIII

A basecoating composition is prepared consisting of the ingredients in the relative amounts set forth in the following TABLE 10.

TABLE 10

| Basecoating Composition | Percent by Weight |
|---|---|
| Silane addition interpolymer solution[1] | 37.6 |
| Pigment paste[2] | 4.3 |
| Polysiloxane solution[3] | 0.3 |
| Ultraviolet light (UV) absorber[4] | 0.5 |
| Gamma-methacryloxypropyltrimethoxysilane | 0.1 |
| Triethylorthoformate | 2.7 |
| Dibutyltin dilaurate solution[5] | 11.9 |
| Xylene | 10.2 |
| Butyl acetate | 8.6 |
| Acetone | 8.5 |
| Methylethyl Ketone | 3.4 |
| Solvesso 100[6] | 5.1 |
| Lactol spirits | 5.1 |
| Diethylene glycol monobutyl ether acetate | 1.7 |

[1]As prepared in EXAMPLE VII.
[2]The pigment paste has a pigment weight concentration (PWC) of 46.4% where PWC equals 100 times weight of pigment solids divided by (weight of pigment solids + weight of acrylic copolymer resin solids), and is composed of 20.4% by weight pigment solids, 23.6% by weight acrylic copolymer resin solids, and 50.6% by weight solvents. The pigment solids are composed of 71% by weight nonleafing aluminum flakes, 18% by weight phthalo blue, and 11% by weight anthraquinone. The pigments are dispersed in the acrylic copolymer resin having a peak molecular weight of 20,000 determined by gel permeation chromatography (54% by weight methyl methacrylate, 10% by weight butyl methacrylate, 10% by weight 2-ethylhexl acrylate, 25% by weight styrene, and 1% by weight acrylic acid which has been partially reacted with hydroxyethyl ethyleneimine) at 48% by weight resin solids in a mixture of solvents (8.92% by weight toluene, 12.11% by weight naphtha, and 78.97% by weight butyl acetate).
[3]As described in footnote 3 to TABLE 4.
[4]As described in footnote 4 to TABLE 4.
[5]A solution of 2.2 percent by weight dibutyltin dilaurate in toluene.
[6]An aromatic hydrocarbon solvent commonly referred to as a "high flash naphtha" having a flash point of 100° F. (37.8° C.).

The basecoating composition is spray applied to the same type of treated and primed steel panel as described in EXAMPLE IV to form a basecoat. The basecoat is allowed to flash for 45 minutes at room temperature. Immediately thereafter, a clear topcoating consisting of the ingredients in the relative amounts set forth in the following TABLE 11.

TABLE 11

| Topcoating Composition | Percent by Weight |
|---|---|
| Silane addition interpolymer solution[1] | 45.5 |
| Polysiloxane solution[2] | 0.3 |
| Ultraviolet light (UV) stabilizer[3] | 0.6 |
| Triethylorthoformate | 1.8 |
| Gamma-mercaptopropyltrimethoxysilane | 0.1 |
| Dibutyltin dilaurate solution[4] | 13.3 |
| Butyl acetate | 12.2 |
| Acetone | 6.5 |
| Methylethyl ketone | 2.6 |
| Xylene | 7.8 |
| Solvesso 100[5] | 3.9 |
| Lactol spirits | 3.9 |
| Diethylene glycol monobutyl ether acetate | 1.5 |

[1]As prepared in EXAMPLE VII.
[2]As described in footnote 3 to TABLE 4.
[3]As described in footnote 4 to TABLE 4.
[4]As described in footnote 5 to TABLE 10.
[5]As described in footnote 6 to TABLE 10.

The resulting basecoat and topcoat are allowed to cure at room temperature to a dry film thickness of the basecoat of 1.7 mils and a dry film thickness of the topcoat of 1.2 mils. The following properties as set forth in the following TABLE 12 for the composite basecoat/topcoat are determined after 24 hours and 168 hours respectively from when the topcoating composition is applied to the basecoat.

TABLE 12

| | 24 Hours | 168 hours |
|---|---|---|
| 20° Gloss | 86 | 86 |
| Distinctness of Image (DOI) | 75 | 70 |
| Sward Hardness | 8 | 24 |
| Pencil Hardness | 6B | HB |
| Resistance to gasoline[1] | Fair | Excellent |

[1]Determined using the same procedure described in footnote 1 to TABLE 6.

What is claimed is:

1. A method of coating a substrate comprising the steps of:

(a) coating a substrate with one or more applications of a pigmented basecoating composition comprising an addition interpolymer having alkoxy silane groups and/or acyloxy silane groups, said addition interpolymer derived from the reaction of a mixture of monomers wherein the mixture of monomers consists essentially of:

(i) from about 50 percent to about 95 percent by weight of at least one ethylenically unsaturated silicon-free monomer, and (ii) from about 5 percent to about 50 percent by weight of a copolymerizable ethylenically unsaturated silane monomer selected from the group consisting of an alkoxy silane monomer, an acyloxy silane monomer, and a mixture thereof, wherein the interpolymer has a peak molecular weight, as determined by gel permeation chromatography, of from about 2,000 to about 20,000 and a calculated glass transition temperature of at least about 25° C., to form a basecoat; and before a substantial amount of drying or curing of said basecoat has occurred (b) coating the basecoat with one or more applications of a topcoating composition comprising a film-forming resin to form a clear topcoat;

wherein, after said steps (a) and (b), said basecoat and said topcoat dry or cure together.

2. The method of claim 1 wherein the ethylenically unsaturated silicon-free monomer is substantially devoid of active hydrogen atoms.

3. The method of claim 1 wherein the ethylenically unsaturated silicon-free monomer used in making the addition interpolymer is an alkyl acrylate, alkyl methacrylate, vinyl aromatic hydrocarbon or a mixture thereof.

4. The method of claim 3 wherein the alkyl acrylate and alkyl methacrylate contain from 1 to 12 carbon atoms in the alkyl group.

5. The method of claim 3 wherein the vinyl aromatic hydrocarbon is styrene, vinyl toluene, alpha-methylstyrene or a mixture thereof.

6. The method of claim 3 wherein the silane monomer used in making the addition interpolymer is an acrylatoalkoxysilane monomer having from 1 to 4 carbon atoms in the alkoxy group.

7. The method of claim 6 wherein the acrylatoalkoxysilane monomer is gamma-methacryloxypropyltrimethoxysilane, gamma-methacryloxypropyltriethoxysilane or a mixture thereof.

8. The method of claim 7 wherein the addition interpolymer used in the basecoating composition has a peak molecular weight ranging from about 10,000 to about 18,000.

9. The method of claim 1 wherein the topcoating composition contains as film-forming resin at least one resin selected from the group consisting of said addition interpolymers, acrylics, aminoplasts, urethanes, cellulosics, polyesters, epoxies and a mixture thereof.

10. The method of claim 1 wherein the basecoating composition and/or the topcoating composition comprises an additive for sag resistance and/or pigment orientation containing polymer microparticles.

11. The method of claim 9 wherein the mixture of monomers used in making the addition interpolymer consists essentially of from about 70 percent to about 90 percent by weight of the ethylenically unsaturated silicon-free monomer and from about 10 percent to about 30 percent by weight of the copolymerizable acrylatoalkoxysilane monomer.

12. The method of claim 1 wherein a mercaptoalkyl trialkoxysilane is used as a chain transfer agent in the reaction of the mixture of monomers to make the addition interpolymer.

13. The method of claim 1 wherein the film-forming resin used in the topcoating composition is an addition interpolymer having alkoxy silane groups and/or acyloxy silane groups, said addition interpolymer being derived from the reaction of a mixture of monomers wherein the mixture of monomers consists essentially of: (i) from about 50 percent to about 95 percent by weight of at least one ethylenically unsaturated silicon-free monomer, and (ii) from about 5 percent to about 50 percent by weight of a copolymerizable ethylenically unsaturated silane monomer selected from the group consisting of an alkoxy silane monomer, an acyloxy silane monomer, and a mixture thereof, wherein the addition interpolymer in the topcoating composition has a peak molecular weight, as determined by gel permeation chromatography, of from about 2,000 to about 15,000 and has a glass transition temperature of at least about 25° C.

14. The method of claim 13 wherein the peak molecular weight of the addition interpolymer in the topcoating composition ranges from about 4,000 to about 10,000 and has a glass transition temperature of at least about 45° C.

15. The method of claim 1 wherein at least a portion of the pigment in the pigmented basecoating composition consists of metallic flakes.

16. The product produced by the method of claim 1.

17. The product produced by the method of claim 8.

18. The product produced by the method of claim 11.

19. The product produced by the method of claim 14.

20. The product produced by the method of claim 15.

21. A method of coating a substrate comprising the steps of (a) coating a substrate with one or more applications of a pigmented basecoating composition containing a film-forming resin to form a basecoat; and before a substantial amount of drying or curing of said basecoat has occurred (b) coating said basecoat with one or more applications of a topcoating composition comprising and addition interpolymer derived from the reaction of a mixture of monomers, wherein the mixture of monomers consists essentially of:

(i) from about 50 percent to about 95 percent of at least one ethylenically unsaturated silicon-free monomer, (ii) from about 5 percent to about 50 percent of a copolymerizable ethylenically unsaturated silane monomer selected from the group consisting of an alkoxy silane monomer, an acyloxy silane monomer, and a mixture thereof, wherein the addition interpolymer has a peak molecular weight, as determined by gel permeation chromatography, of from about 2,000 to about 20,000 and a calculated glass transition temperature of at least about 25° C., and (iii) catalyst at a level of from about 0.1 parts to about 5 parts catalyst for each 100 parts of the addition interpolymer, to form a clear topcoat;

wherein, after said steps (a) and (b), said basecoat and said topcoat dry or cure together.

22. The method of claim 21 wherein the ethylenically unsaturated silicon-free monomer is substantially devoid of active hydrogen atoms.

23. The method of claim 21 wherein the ethylenically unsaturated monomer (i) used in making the addition interpolymer is an alkyl acrylate, alkyl methacrylate, vinyl aromatic hydrocarbon or a mixture thereof.

24. The method of claim 23 wherein the alkyl acrylate and alkyl methacrylate contain from 1 to 12 carbon atoms in the alkyl group.

25. The method of claim 23 wherein the vinyl aromatic hydrocarbon is styrene, vinyl toluene, alphamethylstyrene or a mixture thereof.

26. The method of claim 21 wherein the silane monomer used in making the addition interpolymer is an acrylatoalkoxysilane monomer having from 1 to 4 carbon atoms in the alkoxy group.

27. The method of claim 26 wherein the acrylatoalkxysilane monomer is gamma-methacryloxypropyltrimethoxysilane, gamma-methacryloxypropyltriethoxysilane or a mixture thereof.

28. The method of claim 27 wherein the addition interpolymer used in the topcoating composition has a peak molecular weight ranging from about 2,000 to about 15,000.

29. The method of claim 21 wherein the basecoating composition contains as a film-forming resin at least one resin selected from the group consisting of acrylics, aminoplasts, urethanes, cellulosics, polyesters, epoxies, and a mixture thereof.

30. The method of claim 21 wherein the basecoating composition and/or the clear topcoating composition comprises an additive for sag resistance and/or pigment orientation containing polymer microparticles.

31. The method of claim 29 wherein the mixture of monomers used in making the addition interpolymer consists essentially of from about 70 percent to about 90 percent of the ethylenically unsaturated silicon-free monomer (i) and from about 10 percent to about 30 percent of the compolymerizable acrylatoalkoxysilane.

32. The method of claim 21 wherein a mercaptoalkyl trialkoxysilane is used as a chain transfer agent in the reaction of the mixture of monomers to make the addition interpolymer.

33. The method of claim 21 wherein at least a portion of the pigment in the pigmented basecoating composition consists of metallic flakes.

34. The product produced by the method of claim 21.

35. The product produced by the method of claim 28.

36. The product produced by the method of claim 31.

37. The product produced by the method of claim 33.

* * * * *

UNITED STATES PATENT AND TRADEMARK OFFICE

CERTIFICATE OF CORRECTION

PATENT NO. : 4,499,150

DATED : February 12, 1985

INVENTOR(S) : Rostyslaw Dowbenko, Raymond S. Stewart, Marvis E. Hartman, Barbara Gorman and Stephen J. Thomas It is certified that error appears in the above-identified patent and that said Letters Patent is hereby corrected as shown below:

Column 20, line 42, delete the word "and" and insert --an--.

Column 21, lines 13 and 14 delete the word "acrylatoalkysilane" and insert --acrylatoalkoxysilane--.

Column 22, line 12 delete the word "compolymerizable" and insert --copolymerizable--.

Signed and Sealed this

*Second* Day of *July 1985*

[SEAL]

*Attest:*

DONALD J. QUIGG

*Attesting Officer* *Acting Commissioner of Patents and Trademarks*